United States Patent
Kikuchi

(10) Patent No.: US 9,811,751 B2
(45) Date of Patent: Nov. 7, 2017

(54) IMAGE PICKUP APPARATUS WITH BOUNDARY IDENTIFIER FOR AREAS OF INTEREST

(71) Applicant: CANON KABUSHIKI KAISHA, Tokyo (JP)

(72) Inventor: Takayuki Kikuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 164 days.

(21) Appl. No.: 14/256,160

(22) Filed: Apr. 18, 2014

(65) Prior Publication Data

US 2014/0313320 A1 Oct. 23, 2014

(30) Foreign Application Priority Data

Apr. 19, 2013 (JP) ................................ 2013-088026

(51) Int. Cl.
| | | |
|---|---|---|
| *H04N 7/18* | (2006.01) | |
| *G06K 9/32* | (2006.01) | |
| *H04N 5/345* | (2011.01) | |
| *G06K 9/20* | (2006.01) | |

(52) U.S. Cl.
CPC ......... *G06K 9/3233* (2013.01); *G06K 9/2063* (2013.01); *H04N 5/3454* (2013.01)

(58) Field of Classification Search
CPC .................................................. G06K 9/3233
USPC ........................................................ 348/133
See application file for complete search history.

(56) References Cited

U.S. PATENT DOCUMENTS

| | | | |
|---|---|---|---|
| 7,728,891 B2 | 6/2010 | Hiyama et al. | |
| 8,553,123 B2 | 10/2013 | Noda et al. | |
| 2002/0085219 A1* | 7/2002 | Ramamoorthy | ........ G06T 15/10 |
| | | | 358/1.9 |
| 2011/0199524 A1* | 8/2011 | Noda | ................... H04N 3/1512 |
| | | | 348/304 |

(Continued)

FOREIGN PATENT DOCUMENTS

| | | |
|---|---|---|
| CN | 101047797 A | 10/2007 |
| CN | 101420509 A | 4/2009 |
| JP | 9-214836 A | 8/1997 |

(Continued)

OTHER PUBLICATIONS

Office Action issued in Chinese Appln. No. 2014101603025 dated Dec. 22, 2016. English translation provided.

(Continued)

*Primary Examiner* — Richard Torrente
(74) *Attorney, Agent, or Firm* — Rossi, Kimms & McDowell LLP

(57) ABSTRACT

An image pickup apparatus includes: an interest area setter configured to input a signal for setting multiple interest areas inside an image pickup area of an image sensor; a readout area setter configured to set a readout area from which an image signal is read out from the image sensor; a sensor readout controller configured to control readout of a pixel signal of the readout area from the image sensor; an output signal generator configured to generate an image signal to be output based on the pixel signal read out by the sensor readout controller; and a boundary identifier configured to make identifiable a boundary of each of the multiple interest areas in an image formed by the image signal to be output.

8 Claims, 9 Drawing Sheets

(56) References Cited

U.S. PATENT DOCUMENTS

2013/0034266 A1* 2/2013 Shamir ................ G06K 9/6293
                                                      382/103
2015/0085114 A1* 3/2015 Ptitsyn ................... H04N 7/183
                                                      348/143

FOREIGN PATENT DOCUMENTS

| JP | H09214836 A | 8/1997 |
| JP | 2009288945 A | 12/2009 |
| JP | 2013-150265 A | 8/2013 |

OTHER PUBLICATIONS

Office Action issued in Japanese Patent Application No. 2013-088026 dated Jan. 24, 2017. English translation provided.
Office Action issued in Japanese Patent Application No. 2013-088026 dated Jan. 24, 2017.
Office Action issued in Chinese Appln. No. 201410160302.5 dated Aug. 25, 2017. English translation provided.

* cited by examiner

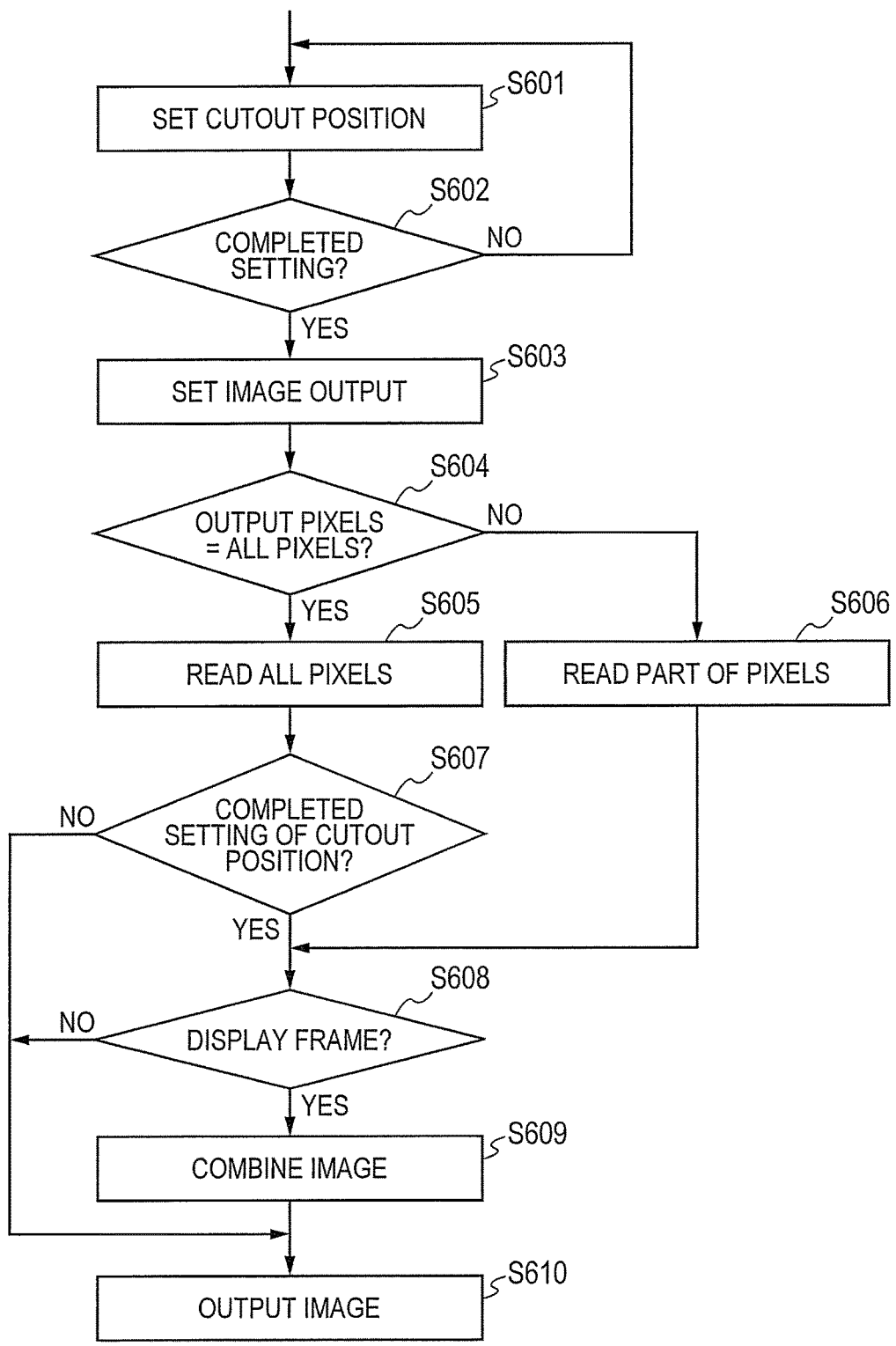

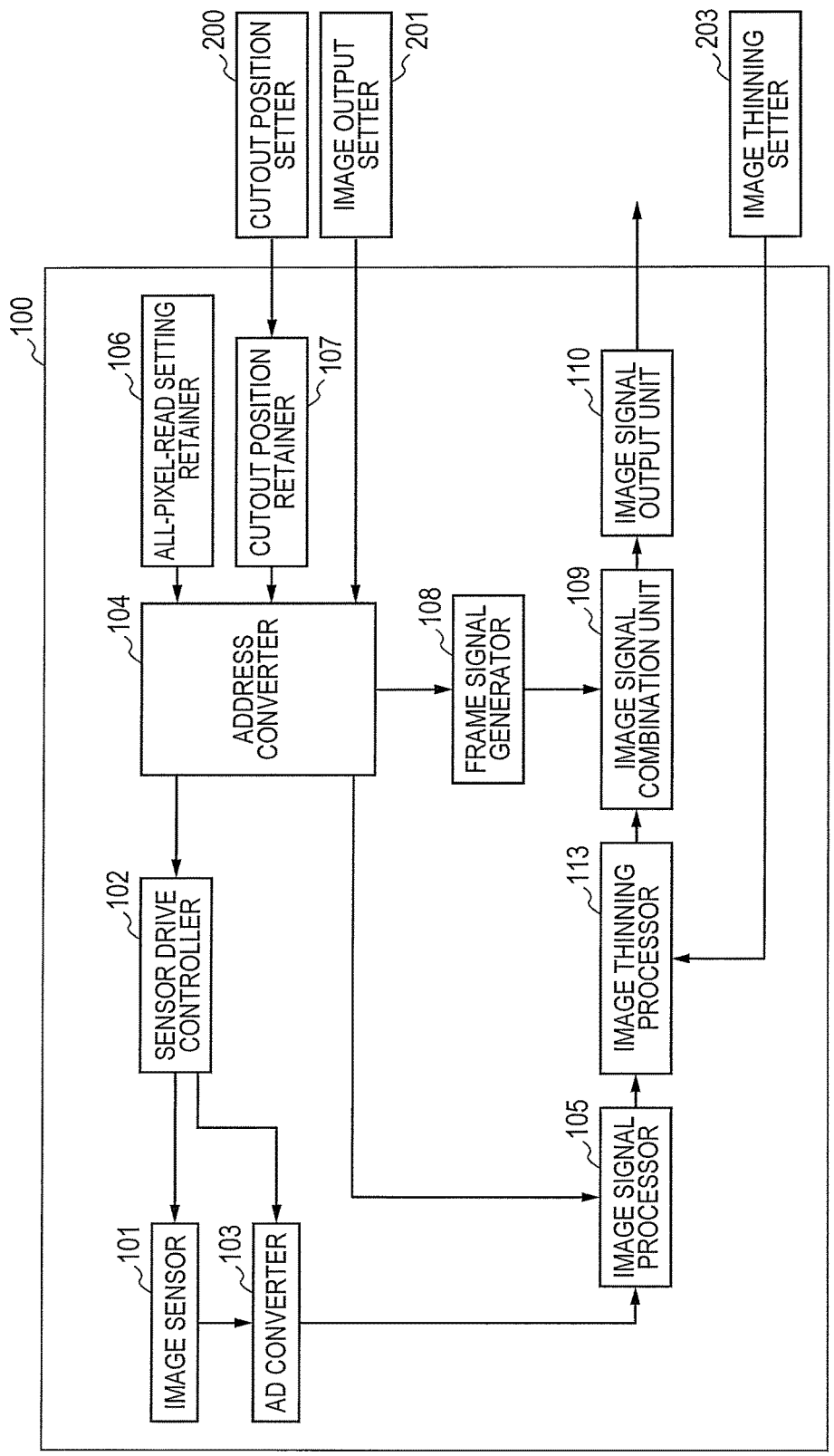

IMAGE PICKUP APPARATUS WITH BOUNDARY IDENTIFIER FOR AREAS OF INTEREST

BACKGROUND OF THE INVENTION

Field of the Invention

The present invention relates to an image pickup apparatus, and more particularly, to an image pickup apparatus having a function of outputting a partially read-out taken image.

Description of the Related Art

In production lines of factories, image pickup apparatus for image input have been used instead of visual inspection by an inspector. Those image pickup apparatus are also called machine vision cameras, which are used for inspecting various components and products together with a computer or a digital input/output apparatus. In recent years, in order to improve the inspection accuracy, an image pickup apparatus including ten-million or more pixels has been used.

When such an image pickup apparatus is used to image a subject and read out signals from all of the pixels in the pixel arrays, the number of pixels is large, and hence a long period of time is necessary to read out the signals from the pixel arrays. This reduces the number of images to be taken per second. Further, the amount of data of the taken image to be output to an external device increases, and hence the frame rate decreases. As described above, in the machine vision camera, the total period of time for readout changes depending on the number of pixels for image pickup, and the frame rate changes depending on the number of pixels to be transmitted to a portion external to the image pickup apparatus as an image.

In view of this, in Japanese Patent Application Laid-Open No. H09-214836, there is proposed a technology of reducing a time period to read out signals from pixel arrays by performing so-called thinning-readout of specifying a part of the pixel arrays as an interest area and reading out only the interest area. According to this technology, the number or images to be taken per second increases. Further, the amount of data of the taken image to be output to the external device reduces to increase the frame rate. Such thinning-readout can be set dynamically, and the frame rate changes depending on the number of pixels that are read out and the amount of data to be output to the external device.

For example, in Japanese Patent Application Laid-Open No. H09-214836, there is disclosed a technique of operating the readout of an image pickup element and causing a display device to simultaneously display all of the pixels and partially enlarged pixels so as to facilitate adjustment of the angle of view before image pickup.

However, the related art disclosed in Japanese Patent Application Laid-Open No. H09-214836 described above cannot respond to a case where multiple interest areas are present. Further, the relative positional relationship of the interest area with respect to the entire pixel image is not clear, and hence it is difficult to set the interest area.

SUMMARY OF THE INVENTION

In view of this, the present invention provides an image pickup apparatus that enables rapid grasping of an interest area setting state with respect to an entire pixel image when multiple interest areas are set, and facilitates an environment setting before image pickup.

In order to achieve the above-mentioned object, according to one embodiment of the present invention, there is provided an image pickup apparatus including: an interest area setter configured to input a signal for setting multiple interest areas inside an image pickup area of an image sensor; a readout area setter configured to set a readout area from which image signal is read out from the image sensor; a sensor readout controller configured to control readout of a pixel signal of the readout area from the image sensor; an output signal generator configured to generate an image signal to be output based on the pixel signal read out by the sensor readout controller; and a boundary identifier configured to make identifiable of a boundary of each of the multiple interest areas in an image formed by the image signal to be output.

According to embodiment of the present invention, by applying the present invention when the multiple interest areas are set, it is possible to provide the image pickup apparatus that enables rapid grasping of the setting state of each of the interest areas with respect to all of the pixels, and facilitates adjustment of the angle of view before the image pickup.

Further features of the present invention will become apparent from the following description of exemplary embodiments with reference to the attached drawings.

BRIEF DESCRIPTION OF THE DRAWING

FIG. 6 is a flowchart of processing in an address converter in the first embodiment.

FIG. 13 is a configuration diagram of an image pickup apparatus according to a third embodiment of the present invention.

DESCRIPTION OF THE EMBODIMENTS

Now, exemplary embodiments of the present invention are described in detail with reference to the accompanying drawings.

First Embodiment

Figure 1:
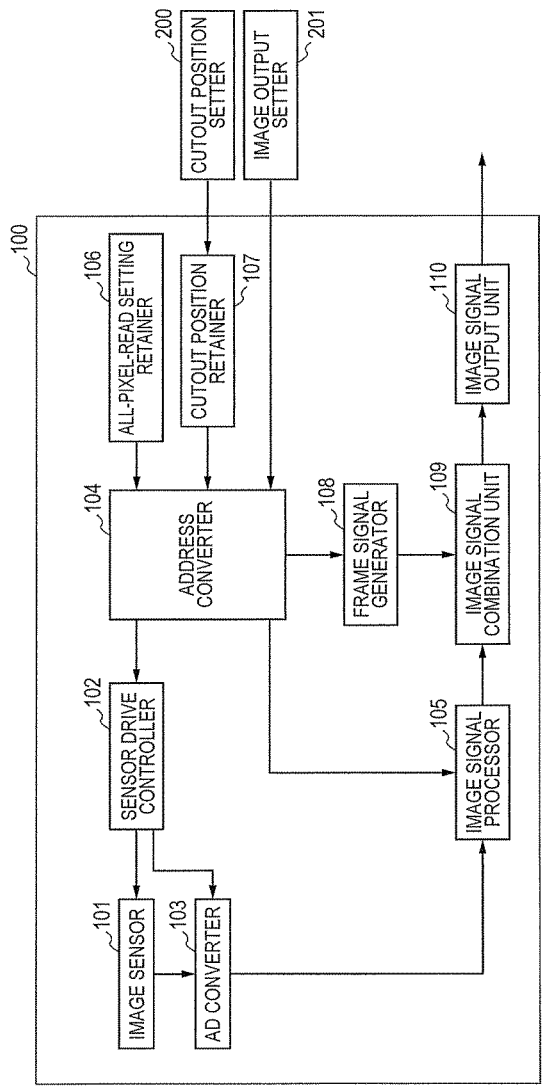
FIG. 1 is a configuration diagram of an image pickup apparatus according to a first embodiment of the present invention.

FIG. 1 is a configuration diagram of an image pickup apparatus according a first embodiment of the present invention.

An image pickup apparatus 100 includes an image pickup system including an image sensor 101, and performs image pickup processing by a sensor drive controller 102 (sensor readout controller), an AD converter 103, and an address converter 104. Light flux that passes through a lens (not shown) forms an image on the image sensor 101 of the image pickup apparatus 100. The sensor drive controller 102 controls an accumulation operation and a readout operation of the image sensor 101. When the sensor drive controller 102 performs the image pickup processing of the image sensor 101, an image pickup signal is output from the image sensor 101 to the AD converter 103, which undergoes A/D conversion by the AD converter 103. The address converter (readout area setter) 104 calculates an address of a pixel of the image sensor 101 to be subjected to accumulation control an readout control by the sensor drive controller 102. When thinning-readout from the image sensor 101 is performed, addresses for only pixels selected for readout are output from among all of the pixels of the image sensor 101, and addresses for pixels not selected for readout are skipped.

An image signal processor 105 inputs image pickup signal data from the AD converter 103 and a signal from the address converter 104, and provides a frame synchronizing signal, a vertical synchronizing signal, a horizontal synchronizing signal, and the like with respect to the image pickup signal data. A cutout position setter (interest area setter) 200 inputs and sets, from an external of the image pickup apparatus 100, coordinate data of an area (hereinafter referred to as "interest area") containing necessary image data (object image) inside the image pickup area of the image sensor. The external device refers to, for example, performing setting by using a communication unit from a PC or the like so as to set the cutout position in the cutout position setter 200. A cutout position retainer 107 retains setting data input by the cutout position setter 200. An entire pixel readout setting retainer 106 retains a range setting value for accumulation and readout of all of the pixels of the image sensor 101.

The address converter 104 inputs setting data from the cutout position retainer 107 and from the entire pixel readout setting retainer 106, selects any one of the setting data, and passes the selected setting data to the sensor drive controller 102 and the image signal processor 105. Further, the address converter 104 passes the setting data of the cutout position retainer 107 to a frame signal generator 108 (boundary identifier). The frame signal generator 108 generates, based on the signal from the address converter 104, a frame signal for displaying a bordering line for bordering the interest area set in the cutout position setter 200 so as to clearly identify the boundary or the interest area inside an image to be output.

An image output setter 201 performs, from the external device of the image pickup apparatus 100, setting of whether or not to display the interest area with the bordering line and setting of whether to output data while excluding pixel data outside the interest area or to output data of all of the pixels. The external device refers to, for example, performing setting by using a communication unit from a PC or the like so as set frame display that represents the interest area to the frame signal generator 108.

An image signal combination unit 109 combines image pickup signal data output from the image signal processor 105 with a frame signal for displaying the interest area of the frame signal generator 108 in accordance with a setting value from the image output setter 201. An image signal output unit 110 outputs an output image signal generated by the image signal combination unit 109 to a portion external to the image pickup apparatus 100.

The image signal processor 105 and the image signal combination unit 109 constitute an output signal generator. Based on information on the pixel data read out from the image sensor 101, the readout area, the interest area, the above-mentioned various synchronizing signals, and the like, the output signal generator generates the output image signal to be output to a portion external to the image pickup apparatus 100.

Figure 2:
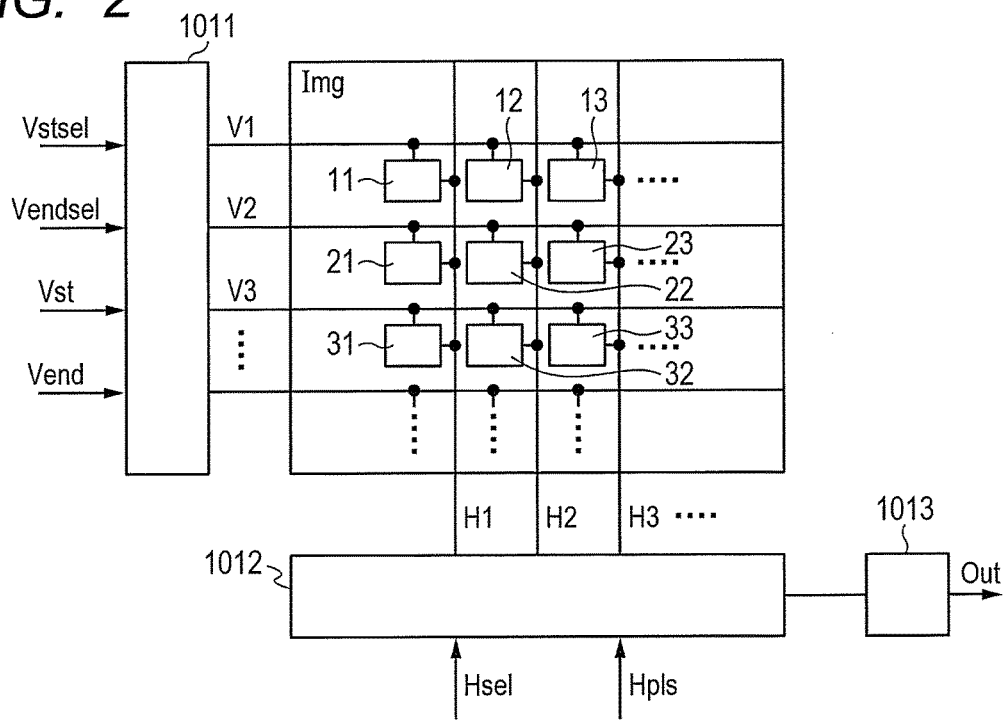
FIG. 2 is a configuration diagram of an image sensor.

FIG. 2 illustrates a structure of the image sensor 101 capable of reading out only pixel data of a partial region of a sensor, such as a CMOS sensor. Img of FIG. 2 represents a pixel area of an image pickup element. Reference numerals 11 to 33 in FIG. 2 represent a part of the pixel arrays formed in Img. The respective pixels in Img are connected to vertical circuit 1011 and a horizontal circuit 1012 via signal lines V1, V2, V3, . . . and signal lines H1, H2, H3, . . . , respectively. Signal lines Vstsel and Vendsel for selecting an accumulation start object and an accumulation complete object among the respective lines in Img and signal lines Vst and Vend for providing triggers for start and completion of accumulation are connected to the vertical circuit 1011. When triggers are input through Vstsel and Vendsel, reference lines (V1, V2, V3, . . . ) of the image sensor 101 are incremented in the vertical direction.

Further, similarly, a signal line for Hsel for selecting pixels in the horizontal direction of the lines selected by Vendsel and a signal line Hpls for providing readout pulses are connected to the horizontal circuit 1012. Similarly to Vstsel and Vendsel, when triggers are input through Hsel and Hpls, reference pixels in the vertical lines selected by Vstsel are incremented in the horizontal direction. Control signals are input from the sensor drive controller 102 of FIG. 1 via those signals lines Vstsel, Vendsel, Vst, vend, Hsel, and Hpls. When pulses are input to Hpls for readout control, through an amplifier 1013 of FIG. 2, an analog image pickup signal is output through a signal line Out. This image pickup signal is input to the AD converter 103 of FIG. 1. The AD converter 103 performs A/D conversion on the image pickup signal input to the AD converter 103 in synchronization with Hpls. By controlling the above-mentioned respective control signals by the sensor drive controller 102, pixel data can be read out only from a partial region of the image sensor 101.

Figure 3:
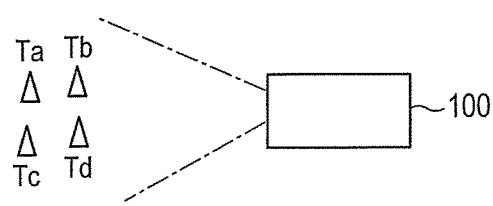
FIG. 3 is an example of an image pickup composition.
Figure 4:
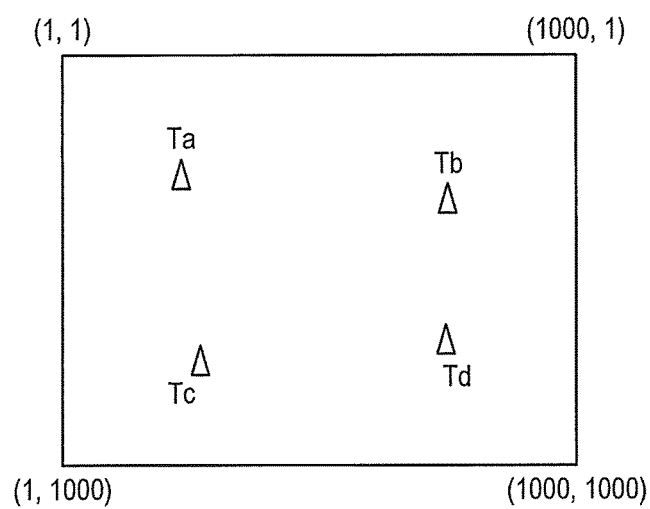
FIG. 4 is an example of a taken image.

FIG. 3 is a composition diagram of imaging image pickup targets Ta, Tb, Tc, and Td with use of the image pickup apparatus 100 of the present invention. The dashed-dotted lines of FIG. 3 represent an angle of view of the image pickup apparatus 100. FIG. 4 illustrates an image taken at this time. In this embodiment, an example is described in which thinning-readout is performed in a taken image illustrated in FIG. 4 with four peripheral areas containing the image pickup targets Ta, Tb, Tc, and Td as respective interest areas. A case where the number of interest areas is 4 is exemplified, but the present invention is similarly applicable to a case where multiple interest areas are set.

Note that, in this embodiment, a case where the number of pixels of the taken image is 1,000 pixels in width by 1,000 pixels in height is exemplified for description, but the number of pixels of the taken image of the present invention is not limited thereto. In the following, for simplifying the description, the position inside the taken image is represented by orthogonal XY coordinates (X, Y). In the figures, a right direction in a left-right (horizontal) direction is referred to as "X direction", and a downward direction in an up-down (vertical) direction is referred toss "Y direction". In this embodiment, description is made supposing that the coordinates at the upper left of the taken image are (1, 1), and the coordinates at the lower right are (1000, 1000).

Figure 5:
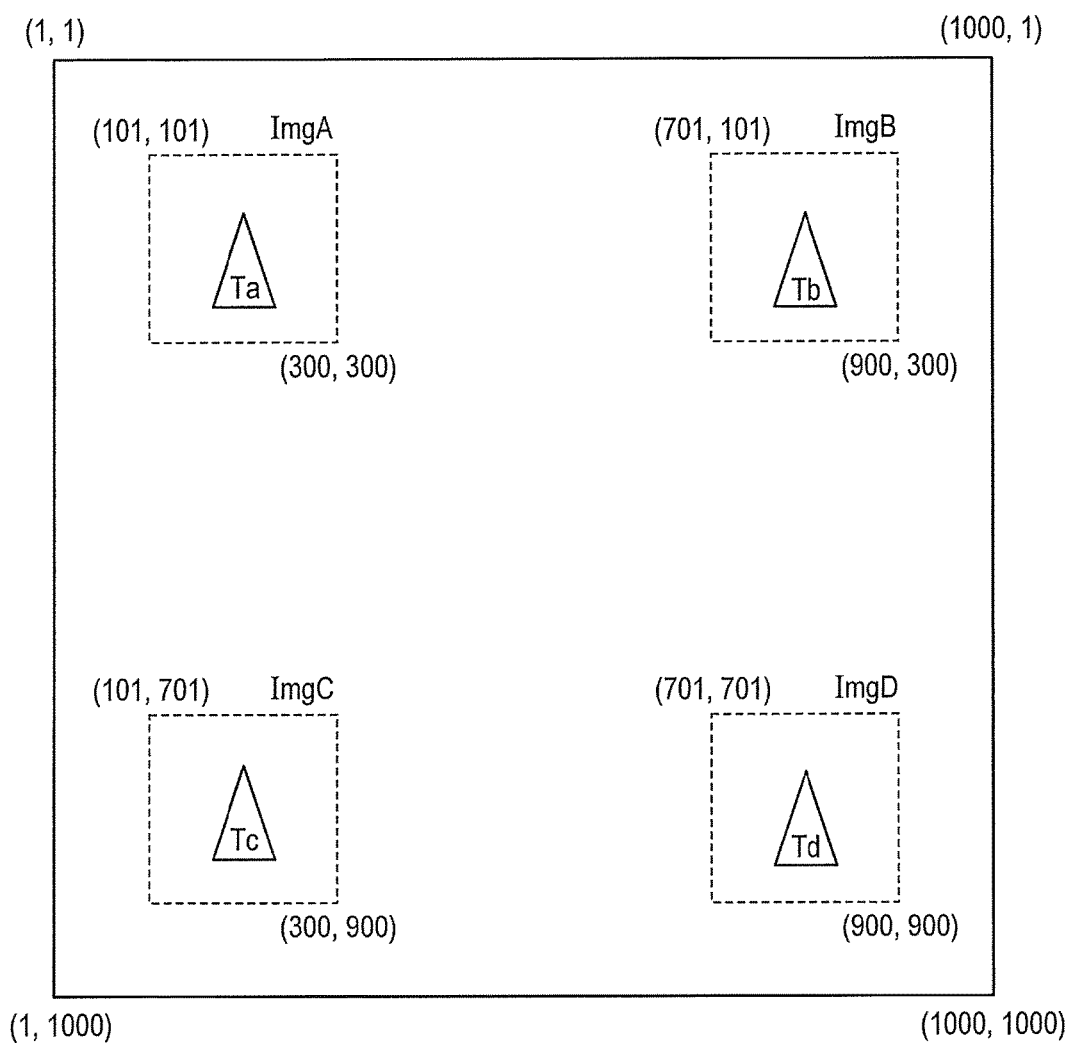
FIG. 5 is an interest area setting example.

In this embodiment, description is made of a partial readout method of a case where, as illustrated in FIG. 5, four interest areas (ImgA, ImgB, ImgC, and ImgD) are set by the cutout position setter 200 of FIG. 1 with respect to the four image pickup targets Ta, Tb, Tc, and Td, respectively.

The interest areas ImgA, ImgB, ImgC, and ImgD are areas containing the image pickup targets Ta, Tb, Tc, and Td, respectively. By providing coordinates at the upper left and the lower right each of the areas, a rectangular interest area having those coordinates as opposing corners is defined. In FIG. 5, the interest area ImgA is a rectangular area surrounded by (101, 101) at the upper left and (300, 300) at the lower right. The interest area ImgB is a rectangular area surrounded by (701, 101) at the upper left and (900, 300) at the lower right. The interest area ImgC is a rectangular area surrounded by (101, 701) at the upper left and (300, 900) at the lower right. The interest area ImgD is a rectangular area surrounded by (701, 701) at the upper left and (900, 900) at the lower right. The cutout position setter of FIG. 1 may include a computer or a setter (not shown), or for example, may include a setter including a mouse, a joy stick, and other input units connected to the image pickup apparatus.

In this embodiment, partial readout is performed with respect to the interest areas set as illustrated in FIG. 5, and skip in reading is performed with respect to a part other than the interest areas, to thereby reduce the readout time period. That is, a part in the image sensor where no interest area is present is computed to define, as an excluding area, an area where an X-coordinate value is not contained in an X-coordinate range of any of the interest areas and an area where a Y-coordinate value is not contained in a Y-coordinate range of any of the interest areas so as to remove the excluding area from an area in which pixel information is to be read out.

When the coordinates of each of the interest areas ImgA, ImgB, ImgC, and ImgD are set by the cutout position setter 200 of FIG. 1 as illustrated in FIG. 5, the cutout position retainer 107 retains the setting coordinates of each of the interest areas. The address converter 104 selects a setting value of the cutout position retainer 107 or a setting value of the entire pixel readout setting retainer 106. When the interest area is not set by the cutout position setter 200, the address converter 104 selects the setting value retained by the entire pixel readout setting retainer 106 to operate in an entire pixel readout mode. Further, when the interest area is set by the cutout position setter 200, the address converter 104 selects the setting value retained by the cutout position retainer 107 to operate in a partial readout mode. In this case, as illustrated in FIG. 5, the interest areas ImgA to ImgD are set by the cutout position setter 200, and hence the address converter 104 selects the setting value retained by the cutout position retainer 107.

Next, the address converter 104 outputs, to the sensor drive controller 102, a line number and a pixel number corresponding to address information for performing accumulation and readout of the image sensor 101. The address converter 104 obtains, from among all of the coordinates of the interest areas ImgA to ImgD, lines (Vn) that do not contain any of the interest areas in all of the pixel positions (horizontal direction positions Hn), and horizontal direction pixel positions (Hn) that do not contain any of the interest areas in all of the lines (Vn). That is, the following can be calculated based on FIG. 5. In the entire screen (1000, 1000), lines (vertical direction positions) that can be thinned in the vertical direction are lines V1 to V100, lines V301 to V700, and lines V901 to V1000. Further, pixels (horizontal direction positions) that can be thinned in the horizontal direction are 1st to 100th pixels, 301st to 700th pixels, and 901st, to 1,000th pixels. Readout is performed while thinning those lines and horizontal direction pixels (addresses).

Address output processing is performed by the address converter 104 of FIG. 1 in synchronization with line control of the image sensor 101 by the sensor drive controller 102. Once line control by the sensor drive controller 102 is completed, address information for controlling the next line is updated and output.

With reference toe flowchart of FIG. 6, an operation of the address converter 104 is described in detail.

In Step S601, coordinate date of an area of the interest area is input from the cutout position setter 200, and the coordinate data is stored in the cutout position retainer 107. In Step S602, whether or not the entire setting of the interest areas is completed is determined, and when the setting of the interest areas is completed, the processing proceeds to Step S603. When the setting of the interest areas is not completed, the processing returns to Step S601 and repeats the setting of the interest areas.

In Step S603, whether or not to display the frame signal and the number of output pixels of the image pickup apparatus specified by the image output setter 201 are read out. In Step S604, the set number of output pixels of the image pickup apparatus read in Step S603 is determined, and the processing proceeds to Step S605 when the entire pixel output is set. When the number of output pixels is not all of the pixels, the processing proceeds to Step S606. In Step S605, addresses for entire pixel readout are transmitted to the sensor drive controller 102 as well as the image signal processor 105, and the processing proceeds to Step S607. In Step S606, addresses corresponding to the cutout position information retained by the cutout position retainer 107 are transmitted to the sensor drive controller 102 as well as the image signal processor 105, and the processing proceeds to Step S608.

In Step S607, whether or not the cutout position retainer 107 retains the cutout position information is determined. When the cutout position information is retained, the processing proceeds to Step S608, and when the cutout position information is not retained, the processing proceeds to Step S610. In Step S608, the display state of the frame signal specified the image output setter 201 is determined. When the frame signal is to be displayed, the processing proceeds to Step S608, and when the frame signal is not to be displayed, the processing proceeds to Step S610.

In Step S608, the frame signal from the frame signal generator 108 is superimposed onto image output data from the image signal processor 105 in the image signal combination unit 109. Then, the processing proceeds to Step S610.

In Step S610, the output image signal generated by the image signal combination unit 109 is output to a portion external to the image pickup apparatus 100.

Figure 7A:
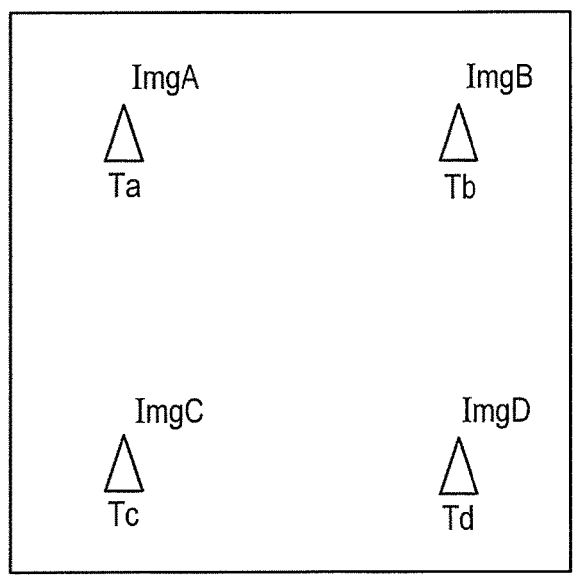
FIG. 7A an image output at the time of entire pixel readout without frame display of the first embodiment.
Figure 7B:
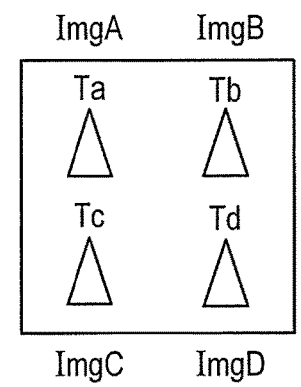
FIG. 7B is an image output at the time of partial readout without frame display of the first embodiment.
Figure 8A:
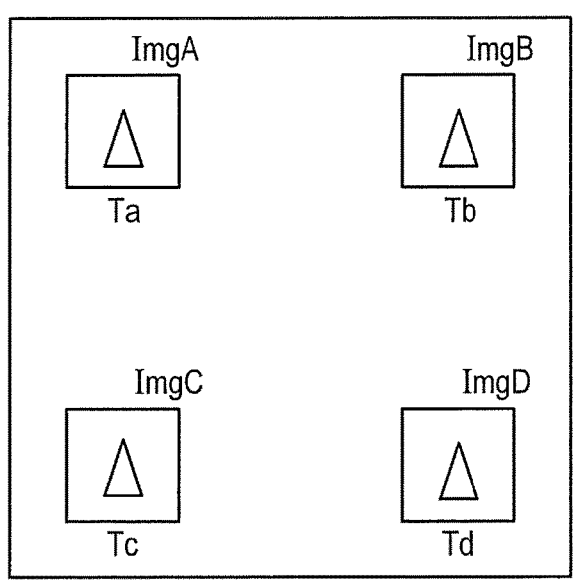
FIG. 8A is an image output at the time of entire pixel readout with frame display of the first embodiment.

An example of image output data obtained by such an image pickup apparatus 100 is described. First, FIG. 7A illustrates an output image in a setting of entire pixel output without frame display, and illustrates an initial state in a machine vision camera. After the image output data of FIG. 7A is confirmed, four pixel areas that image inspection objects ImgA to ImgD are set by the cutout position setter 200 as interest areas. Only the signals of the interest areas are read out to form an image illustrated in FIG. 7B. In FIG. 7B, the respective inspection objects ImgA to ImgD are captured, but the image of FIG. 7B is in a state where it is impossible to determine which part of the image pickup screen is cut out and is further in a state where boundaries of the four interest areas cannot be determined. In contrast, FIG. 8A illustrates an output image in a state where it is determined to output all the pixels in Step S604 and it is determined to display the frame in Step S608. This display state is suitable for confirming which part of the entire screen taken by the machine vision camera is cut out. This display state exerts an effect when, for example, the inspection object is located outside the cutout position and the interest area is changed so as to incorporate the inspection object in the interest area.

Figure 8B:
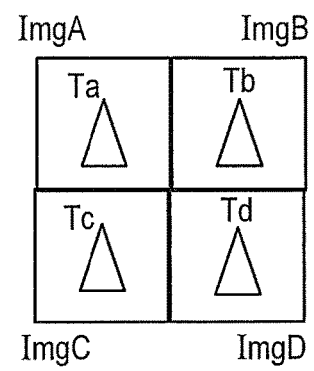
FIG. 8B is an image output at the time of partial readout with frame display of the first embodiment.

Further, FIG. 8B is an output image in a state where it is determined to cut out and output it part of the pixels in Step S604 and it is determined to display the frame in Step S608. In this display state, the boundary of each interest area becomes clear in a cutout image state, and hence this display state is effective for determining that, when a foreign matter other then the inspection object is imaged, at which cutout position the foreign matter is located.

Figure 9:
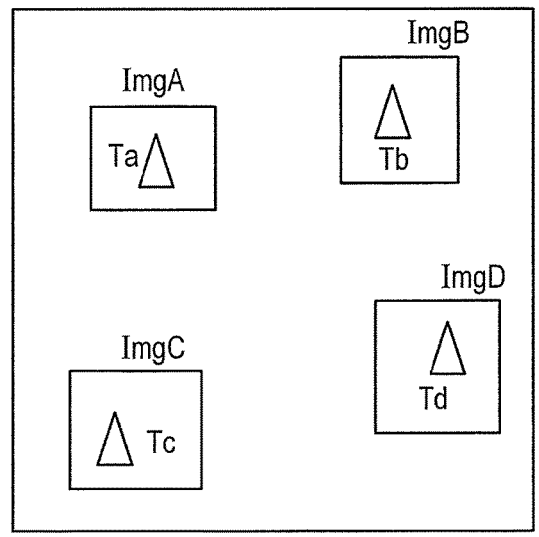
FIG. 9 is an image output at the time of entire pixel readout of the first embodiment.
Figure 10A:
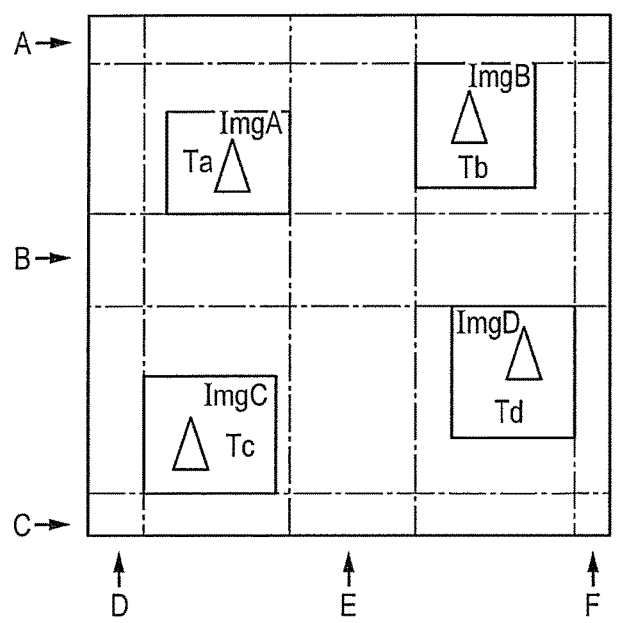
FIG. 10A is an example at the time of partial readout of the first embodiment.
Figure 10B:
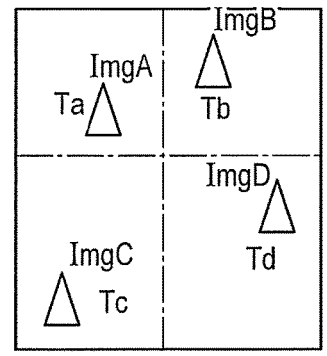
FIG. 10B is an example at the time of partial readout of the first embodiment.
Figure 10C:
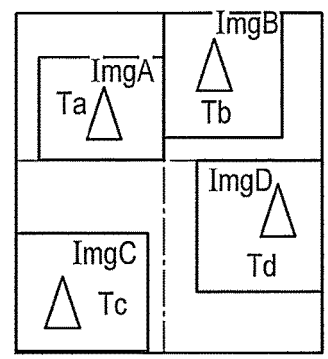
FIG. 10C is an example at the time of partial readout of the first embodiment.

The example described above represents a case where the respective interest areas have end portions that match with each other in a line direction (vertical direction) and in a direction of the pixels in the line (lateral direction). That is, the four interest areas are vertically and laterally arranged in matrix of 2×2 in order. FIG. 9 illustrates an example of a case where the interest areas have different sizes and positions of the end portions thereof do not match with each other in the vertical direction and the lateral direction. In this case, when partial readout is set, lines (vertical direction positions) (A, B, and C in FIG. 10A) and pixel positions (lateral direction positions) (D, E, and F in FIG. 10A) that are not contained in any of the interest areas are skipped in reading. Then, when frame display of the interest area is not set, an image such as that in FIG. 10B is output. Also in this case, by setting frame display of the interest area, an image such as that in FIG. 10C is output. Thus, the boundary of each interest area becomes clear, and presence/absence and position of the image pickup targets (Ta, Tb, and Td) inside the interest areas can be grasped. Further, with such partial readout, the amount of output data can be reduced with a simple configuration, and response to image output at a high frame rate is possible.

In this embodiment, description is made supposing that the cutout position setter 200 and the image output setter 201 have a function of receiving setting information from an external device such as a PC, but setting may be made on a main body of the image pickup apparatus 100.

As described above, by applying the present invention when multiple to interest areas are set, it is possible to rapidly grasp the setting state of each of the interest areas with respect to all of the pixels, and to facilitate adjustment of the angle of view before image pickup.

Second Embodiment

Figure 11:
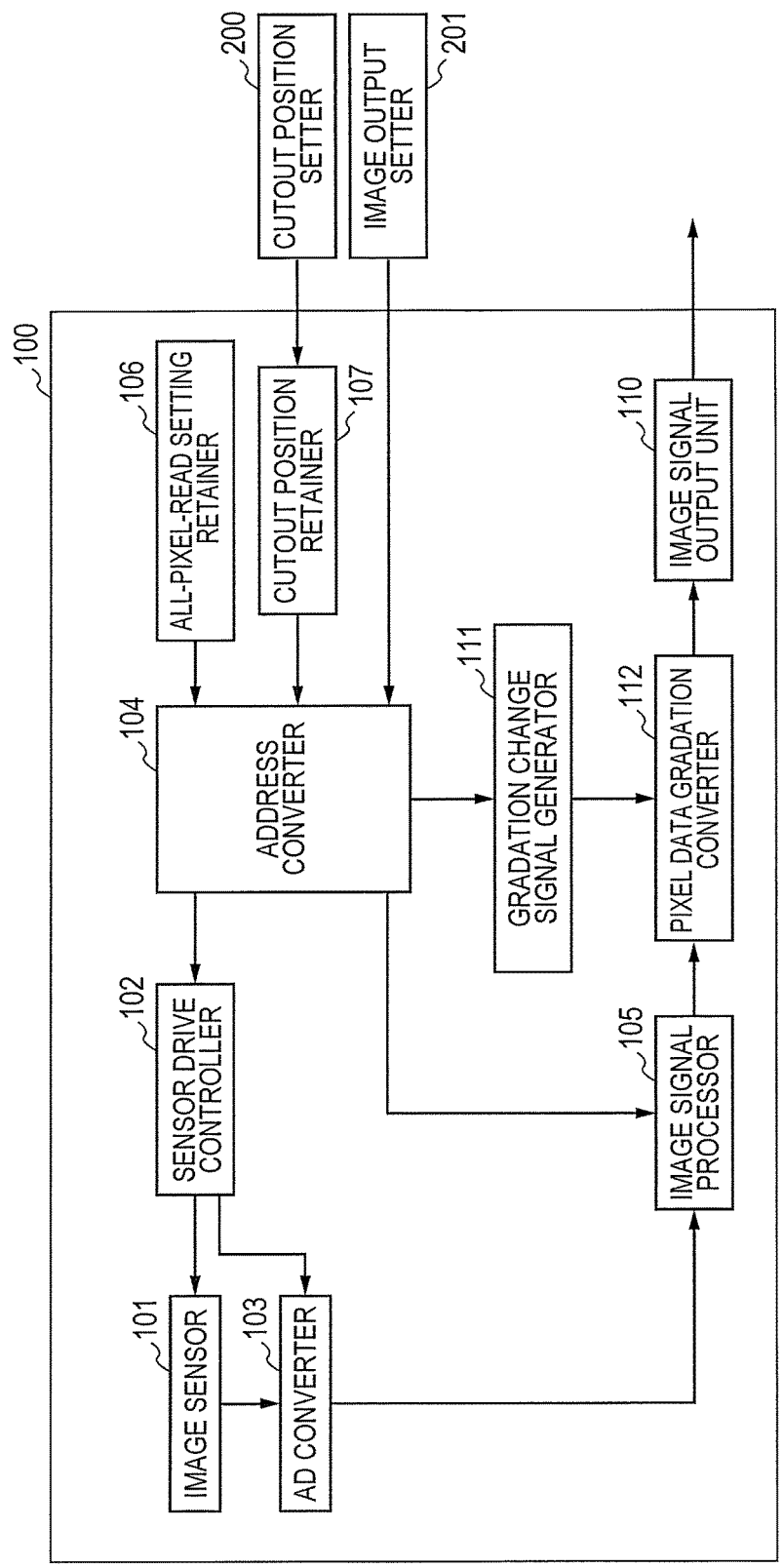
FIG. 11 is a configuration diagram of an image pickup apparatus according to a second embodiment of the present invention.

FIG. 11 is a configuration diagram of an image pickup apparatus according to a second embodiment of the present invention. This embodiment has a feature in that the gradation of pixel data in an area other than the interest areas is lowered to enable identification of display of the interest areas. Note that, description of parts similar to those of the first embodiment is omitted.

Figure 12:
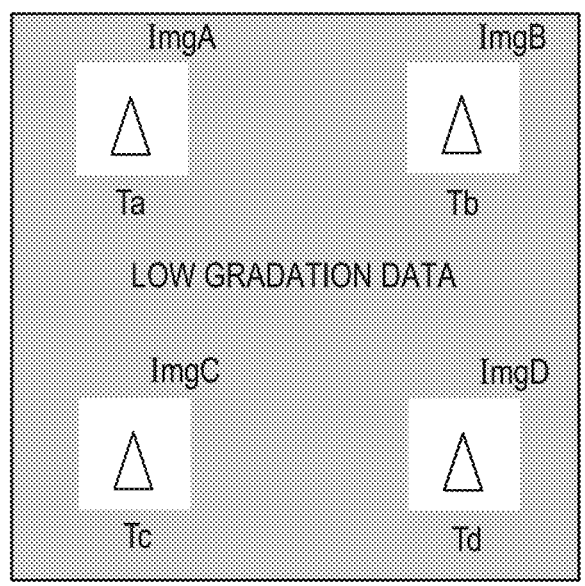
FIG. 12 is a partial readout output image of the second embodiment.

In FIG. 11, cutout position setting information, frame display setting information, and entire pixel display setting information obtained via the cutout position setter 200 and image output setter 201 are received by a gradation change signal generator 111. Then, an identification flag of representing whether not the pixel is contained in the interest area is generated and is output to a pixel data gradation converter 112. In the pixel data gradation converter 112, the pixels inside the interest areas output to an external device while maintaining their gradation read out from the image sensor via the image signal output unit 110. The pixels outside the interest areas are output while lowering their gradation (FIG. 12) by performing processing of blocking a lower bit of data of the AD converter 103 (masking the lower bit by 0 or 1), or the like.

A flowchart of processing in the address converter of the second embodiment is similar to the flowchart of the first embodiment illustrated in FIG. 6, and only differs from the flowchart of the first embodiment in that gradation lowering processing is performed in the image combining processing in Step S609.

With this configuration, the frame display can be replaced by gradation lowering display, and hence the interest area can be distinguished without overwriting data of image pickup pixels unlike frame display.

Third Embodiment

FIG. 13 is a configuration diagram of an image pickup apparatus according to a third embodiment of the present invention. This embodiment has a feature in that, when a pixel thinning function is exerted, the frame display in the entire pixel display is performed in accordance with the set function.

The pixel thinning function is set so as not to read out all of the pixels inside an area set to be cut out, such as reading every second pixel, reading every third pixel, or the like. Such setting of thinning of pixel information is transmitted to an image thinning processor 113 (pixel thinning processor) from an image thinning setter 203 (image output setter) to which a setting value is provided from an external device such as a PC, and thinning processing is performed with respect to pixel data read out from the image sensor 101. The image signal combination unit 109 generates an image signal based on a thinned pixel signal.

When the frame is displayed similarly to the first embodiment in this configuration, at the time of entire pixel display, the image signal of pixels outside the set interest areas is generated also in the set pixel thinning state, and an image signal formed by superimposing a corresponding frame signal onto the thinned pixel signal is output.

With such a configuration, it is possible to output an image signal whose amount to be output can be reduced to increase the frame rate, and whose position of the interest area can be identified in the output image.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processor (CPU), micro processor (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-088026, filed Apr. 19, 2013, which is hereby incorporated by reference herein in its entirety.

What is claimed is:

1. An image pickup apparatus, comprising:
   an image sensor;
   an interest area setter configured to provide a signal for setting a plurality of interest areas inside an image pickup area of the image sensor, each interest area associated with an image pickup target;
   a readout area setter configured to set a readout area from which an image signal is read out from the image sensor, the readout area corresponding to the set plurality of interest areas;
   a memory configured to store a position of the readout area set by the readout area setter;
   a readout mode setter configured to set a first readout mode and a second readout mode;
   a sensor readout controller configured to control the image sensor to perform readout of all pixel signal from the image sensor in a case where the first readout mode is set by the mode setting unit, and to perform readout of a pixel signal of the readout area from the image sensor and not to perform readout of the pixel signal not associated with the readout area in a case where the second readout mode is set by the mode setting unit;
   a frame signal generator configured to generate a plurality of bordering lines corresponding to a boundary of each of the set plurality of interest areas; and
   an output signal generator configured to generate an output image by combining the pixel signal read out by the sensor readout controller with the plurality of bordering lines generated by the frame signal generator,
   wherein the output signal generator is configured to generate the output image on which the bordering lines formed by use of a position of the readout area stored in the memory are superimposed when the image signal is read out according to the first readout mode after the readout area for the second readout mode is set by the readout area setter.

2. An image pickup apparatus according to claim 1, wherein the readout area setter is configured to set, as the readout area, an area excluding, as an excluding area, an area in which an X-coordinate value is outside an X-coordinate range of any of the plurality of interest areas and an area in which a Y-coordinate value is outside a Y-coordinate range of any of the plurality of interest areas, based on coordinates of the each of the plurality of interest areas in an orthogonal XY coordinate.

3. An image pickup apparatus according to claim 1, further comprising an image output setter configured to set whether or not to perform processing of identifying the boundary of the each of the plurality of interest areas on the output image.

4. An image pickup apparatus according to claim 2, further comprising an image output setter configured to set the readout area set by the readout area setter to one of an entire area of the image sensor and the area excluding the excluding area.

5. An image pickup apparatus according to claim 1, further comprising an image thinning processor configured to provide, to the output signal generator, the pixel signal read out from the image sensor after thinning the pixel signal.

6. An image pickup apparatus according to claim 5, further comprising an image output setter configured to set whether or not to cause the image thinning processor to perform thinning processing.

7. An image pickup apparatus according to claim 1, in a case where the readout area setter changes the readout area to an entire area of the image sensor, the output signal generator is configured to generate an output image by combining the pixel signal read out from the entire area of the image sensor with the bordering lines generated by the frame signal generator.

8. A method of picking up an image, comprising:
   providing a signal for setting a plurality of interest areas inside an image pickup area of an image sensor, each interest area associated with an image pickup target;
   setting a readout area from which an image signal is read out from the image sensor, the readout area corresponding to the set plurality of interest areas;
   storing a position of the set readout area;
   setting a first readout mode or a second readout mode;
   controlling the image sensor to perform readout of all pixel signal from the image sensor in a case where the first readout mode is set, and to perform readout of a pixel signal of the readout area from the image sensor and not to perform readout of the pixel signal not associated with the readout area in a case where the second readout mode is set;
   generating a plurality of bordering lines corresponding to a boundary of each of the set plurality of interest areas; and
   generating an output image by combining the readout pixel signal with the bordering lines to make identifiable a boundary of each of the plurality of interest areas in output image,
   wherein the output image on which the bordering lines formed by use of a position of the stored readout area are superimposed is generated when the image signal is read out according to the first readout mode after the readout area for the second readout mode is set.

* * * * *